(12) United States Patent
Hirata

(10) Patent No.: US 6,511,729 B1
(45) Date of Patent: Jan. 28, 2003

(54) OPTICAL INFORMATION MEDIUM AND MAKING METHOD

(75) Inventor: Hideki Hirata, Tokyo (JP)

(73) Assignee: TDK Corporation, Tokyo (JP)

( * ) Notice: Subject to any disclaimer, the term of this patent is extended or adjusted under 35 U.S.C. 154(b) by 50 days.

(21) Appl. No.: 09/619,317

(22) Filed: Jul. 18, 2000

(30) Foreign Application Priority Data

Jul. 19, 1999 (JP) ............................................ 11-204703
Nov. 17, 1999 (JP) ............................................ 11-327521

(51) Int. Cl.$^7$ ................................................. B32B 3/02
(52) U.S. Cl. ...................................... 428/64.1; 428/65.2
(58) Field of Search .............................. 428/64.1, 64.2, 428/64.4, 65.2, 945; 430/200.11, 495.1, 945; 369/275.1, 283, 288

(56) References Cited

U.S. PATENT DOCUMENTS 6,023,451 A * 2/2000 Kashigawa ............... 369/275.5

FOREIGN PATENT DOCUMENTS

| JP | 3-075944 | 12/1991 |
| JP | 9-161333 | 6/1997 |
| JP | 10-269624 | 10/1998 |
| JP | 10-283683 | 10/1998 |

* cited by examiner

*Primary Examiner*—Elizabeth Mulvaney
(74) *Attorney, Agent, or Firm*—Oblon, Spivak, McClelland, Maier & Neustadt, P.C.

(57) ABSTRACT

An optical information medium includes a support substrate (20) having an information recording layer (4) on one surface, and a light transmissive layer (2) thereon, wherein writing and/or reading light enters the information recording layer (4) through the light transmissive layer (2). The light transmissive layer (2) includes a light transmissive resin sheet (201) and an adhesive layer (202) of a UV-curable resin joining the light transmissive sheet to the support substrate and having an average thickness from 0.5 μm to less than 5 μm. The light transmissive layer has a uniform thickness, minimized optical heterogeneity, and least increased birefringence and is effective for restraining medium bowing.

14 Claims, 1 Drawing Sheet

OPTICAL INFORMATION MEDIUM AND MAKING METHOD

This invention relates to optical information media, typically read-only optical disks and optical recording disks, and a method for preparing the optical information media.

BACKGROUND OF THE INVENTION

To record and store a vast quantity of information as typified by moving image information, advanced optical information media such as read-only optical disks and optical recording disks are required to increase their recording density for increasing the capacity. To meet such a demand, engineers have been engaged in the research and development works targeting a higher recording density.

One such approach relating to digital versatile disks (DVD) is to shorten the wavelength of a write/read laser beam and increase the numerical aperture (NA) of a write/read optical system objective lens, thereby reducing the spot diameter of the write/read laser beam. As compared with CD, DVD is successful in achieving a recording capacity of 6 to 8 folds (typically 4.7 GB/side) by changing the write/read wavelength from 780 nm to 650 nm and the NA from 0.45 to 0.6.

Increasing the NA, however, leads to a reduced tilt margin. The tilt margin is a permissible tilt of an optical information medium relative to an optical system, which depends on the NA. The tilt margin is in proportion to $$\lambda/(t \cdot NA^3)$$

wherein $\lambda$ denotes the wavelength of write/read light and "t" denotes the thickness of a transparent substrate the write/read light enters. If the optical information medium is inclined or tilted relative to the laser beam, a wavefront aberration (or coma) occurs. The coefficient of wavefront aberration is represented by $$(\frac{1}{2}) \cdot t \cdot \{n^2 \cdot \sin \theta \cdot \cos \theta\} \cdot NA^3/(n^2-\sin^2\theta)^{-5/2}$$

wherein n denotes the refractive index of the substrate and $\theta$ is a tilt angle. It is appreciated from these formulae that the tilt margin may be increased and the occurrence of comatic aberration be suppressed by reducing the thickness "t" of the substrate. In fact, the DVD design is such that a tilt margin is secured by reducing the thickness of the substrate to about one half (about 0.6 mm) of the thickness (about 1.2 mm) of the CD substrate. On the other hand, the thickness variation margin of the substrate is represented by $$\lambda/NA^4.$$

If the substrate entails a thickness variation, a further wavefront aberration (or spherical aberration) occurs. The coefficient of spherical aberration is represented by $$\{(n^2-1)/8n^3\} \cdot NA^4 \Delta t$$

wherein $\Delta t$ denotes the thickness variation of the substrate. It is appreciated from these formulae that the thickness variation must be minimized before the spherical aberration can be suppressed when the NA is large.

Specifically the thickness variation $\Delta t$ of DVD is limited to $\pm 30$ $\mu$m whereas CD allows for a thickness variation $\Delta t$ of $\pm 100$ $\mu$m.

To record moving images of better quality for a longer period of time, there has been proposed a structure allowing for use of a thinner substrate. In this structure, a substrate of an ordinary thickness is used as a support substrate for maintaining rigidity, pits or a recording layer is formed on the surface of the support substrate, and a light transmissive layer of about 0.1 mm thick is formed thereon as a thin substrate. Write/read light enters the pits or recording layer through the light transmissive layer. This structure can achieve a higher recording density due to a greater NA because the substrate can be made extremely thin as compared with the prior art.

However, the light transmissive layer used in the above structure was very difficult to form by injection molding of resin. It was then desired to have an effective method for forming such a light transmissive layer. For example, JP-A 9-161333 proposes to form a light transmissive layer by spin coating a UV-curable resin. In JP-A 10-269624, a light transmissive layer of uniform thickness is formed by dispersing spacer particles in a photo-curable resin, coating the resin onto a substrate, and pressing a plate against the coating.

The light transmissive layer formed by these methods has the problem that curing of the resin of which the light transmissive layer is formed necessarily entails contraction which causes the medium to bow or warp. If the photo-curable resin is applied as a coating of about 0.1 mm thick, it is difficult to accomplish uniform cure in a thickness direction. Then the light transmissive layer loses optical homogeneity, and the uncured monomer can reduce the reliability of the medium.

Besides, JP-A 10-283683 discloses the bonding of a light transmissive sheet with a UV-curable resin. The method of this patent involves first feeding a UV-curable resin to a substrate surface or a substrate surface and a surface of a light transmissive sheet, placing the light transmissive sheet on the substrate, and rotating the substrate and the light transmissive sheet together for causing the UV-curable resin to spread therebetween. Allegedly, this method precludes deformation of the sheet or spread-out of the adhesive to the readout area, and facilitates to form a light transmissive layer of uniform thickness and a very thin adhesive layer. The method is thus effective for precluding the deformation of the optical recording medium due to initial bowing of the substrate and aging.

JP-A 10-283683 using a UV-curable resin as the adhesive layer has the advantage of reduced bowing as compared with the above-described other methods, because the UV-curable resin layer is thin.

However, the method of JP-A 10-283683 involves several thousands of revolutions of the substrate with the light transmissive sheet rested thereon, during which the sheet can flutter. Then bubbles can be introduced into the adhesive layer to detract from its optical homogeneity. Additionally, the adhesive layer has a greater thickness distribution, especially in a circumferential direction of the disk. In the case of solvent diluted resin, evaporation of the solvent is rather discouraged.

JP-A 10-283683 lacks illustrative examples of the UV-curable resin. Although it is disclosed that the preferred viscosity of the UV-curable resin is in the range of 1 to 1,500 centipoise and the preferred thickness of the adhesive layer is in the range of 0.01 to 10 $\mu$m, the publication lacks any illustrative example of forming an adhesive layer of a particular thickness using a UV-curable resin having a particular viscosity.

SUMMARY OF THE INVENTION

An object of the invention is, in conjunction with an optical information medium having an information recording means on one surface of a support substrate and a light transmissive layer of resin on the support substrate surface, to make the thickness of the light transmissive layer uniform. Another object is to preclude the bowing of such an optical information medium and to minimize the optical heterogeneity, especially birefringence increase of the light transmissive layer.

In a first aspect, the invention provides an optical information medium comprising a support substrate having an information recording means on one surface thereof, and a light transmissive layer on the support substrate surface, wherein writing and/or reading light enters the information recording means through the light transmissive layer. The light transmissive layer includes a light transmissive sheet composed of a resinous material and an adhesive layer for joining the light transmissive sheet to the support substrate, the adhesive layer comprising a cured product of a UV-curable resin and having an average thickness from 0.5 $\mu$m to less than 5 $\mu$m.

Preferably, the light transmissive sheet is composed of a polycarbonate, polyarylate or cyclo-olefin polymer. Also preferably, the light transmissive sheet has been formed by casting the resin.

In a second aspect, the invention provides a method for preparing an optical information medium comprising a support substrate having an information recording means on one surface thereof, and a light transmissive layer on the support substrate surface, wherein writing and/or reading light enters the information recording means through the light transmissive layer, the light transmissive layer comprising a light transmissive sheet composed of a resinous material and an adhesive layer for joining the light transmissive sheet to the support substrate, said adhesive layer comprising a cured product of a UV-curable resin. The method involves the steps of applying the UV-curable resin or a solution thereof onto the entire surface of said support substrate to form a coating; placing the light transmissive sheet on the coating, preferably in a reduced pressure atmosphere; and curing the UV-curable resin into the adhesive layer by irradiating ultraviolet radiation to the coating.

Preferably, the UV-curable resin or the solution thereof has a viscosity of less than 10 centipoise and a solid concentration of 10 to 50% by weight. Optionally interposed between the placing step and the curing step is the pressurizing step of applying a pressure to the surface of the light transmissive sheet, preferably by feeding a gas under pressure over the light transmissive sheet.

BRIEF DESCRIPTION OF THE DRAWING

The only FIGURE.

DESCRIPTION OF THE PREFERRED EMBODIMENT

Figure 1:
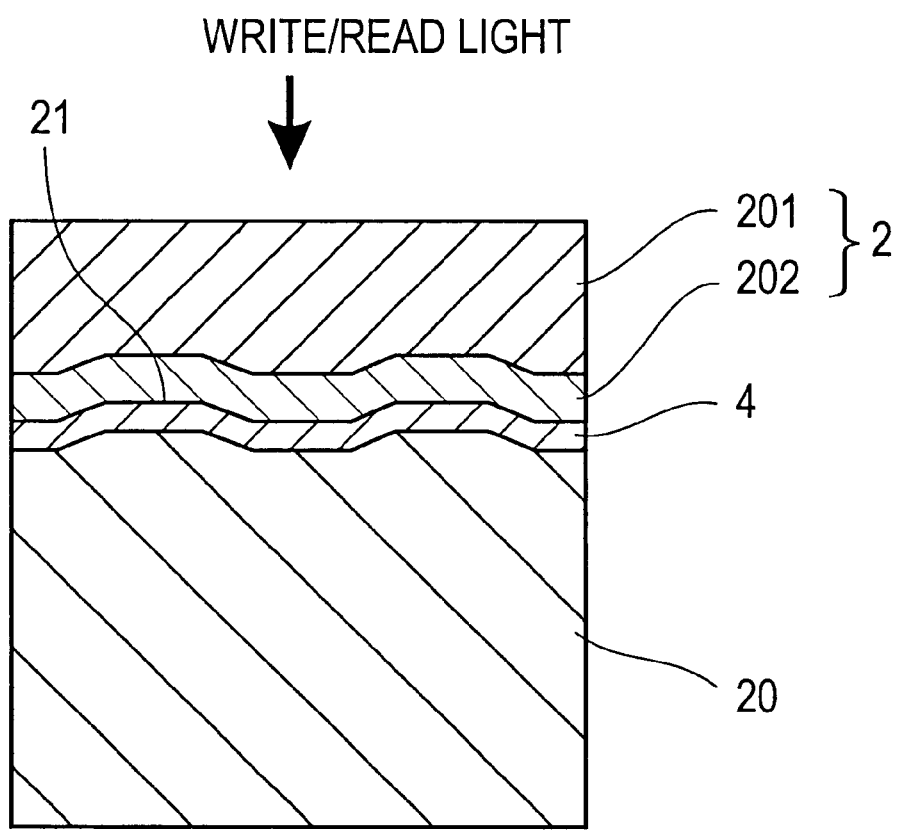
FIG. 1 is a fragmentary, schematic cross-sectional view of an optical information medium according to one embodiment of the invention.

Referring to FIG. 1, an optical information medium according to one preferred embodiment of the invention is illustrated as a recording medium. The medium includes a support substrate 20, a recording layer 4 on one surface of the support substrate 20 serving as an information recording means, and a light transmissive layer 2 on the recording layer 4. Write and/or read light enters the recording layer 4 through the light transmissive layer 2, from above as viewed in the figure. The invention is applicable to any type of information recording means although it often takes the form of a recording layer as in the illustrated embodiment. For example, the invention is applicable to either recording media of the phase change type or recording media of the pit formation type or even magneto-optical recording media. A dielectric layer or reflecting layer is generally provided on at least one side of the recording layer for the purpose of protecting the recording layer or achieving any desired optical effect although such layers are omitted in FIG. 1 merely for brevity of illustration. The invention is not limited to the recordable type illustrated and is applicable to the read-only type. In the latter case, rows of pits formed integrally with the support substrate 20 constitute the information recording means.

In the illustrated optical information medium, the light transmissive layer 2 includes a light transmissive sheet 201 and an adhesive layer 202 for adhesively joining the light transmissive sheet 201 to the support substrate 20. The adhesive layer 202 is transparent to the write/read light and is comprised of a UV-curable resin in the cured state.

The UV-curable resins used herein include radical-polymerizable resins and cation-polymerizable resins.

Suitable oligomers used in radical polymerization are acrylates such as ester acrylates, urethane acrylates, epoxy acrylates, melamine acrylates, and acrylic resin acrylates.

Exemplary of the cation-polymerizable resins are epoxy resins, vinyl ether compounds, and cyclic ether compounds. Any of these resins may be used, with the epoxy resins being especially preferred. The epoxy resins include bisphenol, novolac, alicyclic and aliphatic types. Any of these types may be used, with the alicyclic epoxy resins being especially preferred. The alicyclic epoxy resins may be used alone or preferably in admixture of two or more.

Prior to curing, the resin layer contains such an oligomer or monomer and a photo-polymerization initiator. The photo-polymerization initiator used herein is not critical. For the cation-polymerizable resins, a suitable choice may be made among aromatic diazonium salts, aromatic iodonium salts, aromatic sulfonium salts, and metallocene compounds, with the aromatic sulfonium salts being especially preferred. An appropriate amount of the photo-polymerization initiator added is about 0.1 to 10% by weight based on the resin.

Apart from the radical-polymerizable resins and cation-polymerizable resins, there may be used polythiol-polyene resins of the photo-addition polymerization type.

The adhesive layer should preferably have an average thickness from 0.5 $\mu$m to less than 5 $\mu$m, and more preferably 1 to 3 $\mu$m. If the adhesive layer is too thin, it will absorb an insufficient amount of UV to create active species. Upon curing in air, a too thin adhesive layer is in contact with a large amount of air per unit volume of the adhesive layer, so that active species tend to be deactivated in the case of those resins susceptible to oxygen inhibition (e.g., radical-polymerizable resins) and those resins susceptible to humidity inhibition (e.g., cation-polymerizable resins). Then the adhesive layer does not effectively cure, resulting in a weak bonding force.

Another problem of the thin adhesive layer is the difficulty to form a uniform layer. On the other hand, a too thick adhesive layer will have a substantial thickness distribution.

The average thickness of the adhesive layer is the thickness of the adhesive layer at a position spaced one half of the disk radius from the center of the optical disk.

It is now described how to form the adhesive layer.

The adhesive layer is formed by first applying the UV-curable resin or a solution thereof onto the entire surface of the support substrate (corresponding to the surface of the recording layer 4 in FIG. 1) to form a coating. In order to reduce the thickness distribution and coating variation of the adhesive layer, it is recommended herein to dilute the UV-curable resin with a solvent and applying the resulting resin solution to the substrate surface to form a coating. The solvent used in diluting the resin is not critical. Any of alcohol, ester, cellosolve and hydrocarbon solvents may be selected as long as it does not attack the support substrate and the light transmissive sheet.

The resin solution should preferably have a viscosity of less than 10 centipoise, and more preferably 4 to 6 centipoise. With a too high viscosity, it may be difficult to reduce the thickness distribution of the adhesive layer. With a too low viscosity, it may be difficult to form a uniform adhesive layer. The resin to be applied can have a viscosity within the range without solvent dilution, and even in this case, the thickness distribution of the resulting adhesive layer can be reduced. Since the direct coating of the resin, however, makes it difficult to ensure adhesion and reliability, it is recommended to dilute the resin with a solvent. The viscosity is a measurement at the temperature during application. Although the resin solution can be applied at an elevated temperature, the resin solution is generally applied at or near room temperature, for example, in the range of about 10 to 30° C., that is, heating is unnecessary. Also preferably, the resin solution should have a solid concentration of 10 to 50% by weight, and more preferably 20 to 40% by weight. With a too low solid concentration, it may be difficult to form a uniform adhesive layer. With a too high solid concentration, it may be difficult to reduce the thickness distribution of the adhesive layer.

The coating technique is not critical. Use may be made of spin coating, spray coating, roll coating, screen coating, die coating, curtain coating or dip coating, for example. With the spin coating, the adhesive layer becomes thicker at a location nearer to the outer periphery of the disk. With the roll coating and die coating, the adhesive layer differs in thickness between the leading and trailing sides. When the spin coating, roll coating or die coating is used, the invention exerts to a greater extent its effects, especially its effect of reducing the thickness distribution of the adhesive layer. Of these coating techniques, the spin coating technique is most preferred since it facilitates to form a uniform adhesive layer, causes no damage to the medium owing to non-contact coating, and reduces the surface roughness of the adhesive layer.

After a coating is formed, a light transmissive sheet is placed on the coating. It is preferred to place a light transmissive sheet on the coating in vacuum or in an atmosphere of reduced pressure. The atmosphere should preferably have a subatmospheric pressure, more preferably up to 0.3 atm., and more preferably up to 0.1 atm. Placing a light transmissive sheet on the coating in vacuum is effective for preventing bubbles from being introduced into the adhesive layer, eliminating tracking servo errors caused by bubbles.

After the light transmissive sheet is placed on the coating, ultraviolet radiation is irradiated for curing the coating. For UV irradiation, conventional high-pressure mercury lamps may be used. Cure may be effected with the vacuum kept or in air. Curing in vacuum has the advantage of mitigating oxygen inhibition or humidity inhibition during curing.

In one preferred embodiment of the invention, after the light transmissive sheet is placed on the coating and before the coating is cured, the pressurizing step of applying a pressure to the surface of the light transmissive sheet is provided. By applying a pressure to the light transmissive sheet to pressurize the coating, the thickness distribution of the resulting adhesive layer is further reduced.

The pressurizing means is not critical, and any of conventional mechanical pressurizing means such as hydraulic cylinders, pneumatic cylinders and roll presses may be utilized. It is recommended to feed a gas under pressure for directly pressurizing the light transmissive sheet partly because the light transmissive sheet to be pressurized herein is very thin and mechanically weak unlike the rigid substrates commonly used in conventional optical information media and partly because uniform pressurization is necessary in order to reduce the thickness distribution of the adhesive layer. The gas pressurization not only eliminates any mechanical contact with the light transmissive sheet as by the working face of a press machine, but ensures isotropic pressure application. Although it is unlikely that the coating as spin-coated having a greater thickness near the outer periphery be flattened by isotropic pressurization, it was empirically found that quite surprisingly, gas pressurization is effective in reducing the thickness distribution of the resulting adhesive layer. Isotropic pressurization had the additional advantage of avoiding any increase of thickness distribution by uneven pressurization. The gas used for pressurization is not critical, and air is used in most cases.

The pressure used in the pressurizing step may be set appropriate to reduce the thickness distribution of the adhesive layer. Independent of the particular type of pressurizing means, the applied pressure is preferably about 1.05 to 2.5 atm. and more preferably about 1.1 to 1.8 atm. A too low pressure is ineffective for flattening the adhesive layer. A too high pressure will cause the resin or resin solution to squeeze out from between the support substrate and the light transmissive sheet, contaminating the medium. The pressurizing time is preferably at least 0.2 second though not critical. More than 3 seconds of pressurization is unnecessary.

The applied pressure in the pressurizing step is the extra pressure applied on the basis of the pressure of the atmosphere during the step of placing the light transmissive sheet. More particularly, a pressure of 1.5 atm. applied in the pressurizing step, for example, means that if the sheet is placed on the coating under vacuum, a pressure of 1.5 atm. is applied from that state by the gas or mechanical pressurizing means; or after the ambient air is resumed, an additional pressure of 0.5 atm. is applied by the gas or mechanical pressurizing means. If the sheet is placed on the coating in the air, a pressure of 1.5 atm. is applied from that state by the gas or mechanical pressurizing means.

The pressurizing step interposed is effective for fully reducing the thickness distribution of the adhesive layer even if the adhesive layer is at least 5 $\mu$m thick, or the resin solution has a viscosity of at least 10 centipoise, or a resin other than the solvent dilution type is used. However, even when the pressurizing step is interposed, a too thick adhesive layer tends to cause the medium to bow and the light transmissive sheet to increase its birefringence. For this reason, the adhesive layer should preferably have a thickness of up to 30 $\mu$m, and more preferably up to 20 $\mu$m. When the pressurizing step is interposed, the viscosity of the resin or resin solution to be applied is not critical, and any of conventional coating type adhesives may be used without limitation.

Nevertheless, a viscosity of up to 5,000 centipoise during coating is usually preferred.

Next, the light transmissive sheet is described.

Suitable materials of which the light transmissive sheet is made are polycarbonates, polyarylates and cyclo-olefin polymers.

The polycarbonates used herein are not critical. For example, aromatic polycarbonates of the conventional bisphenol type are useful. Polycarbonate sheets prepared by casting to be described later are commercially available under the trade name of Pure Ace from Teijin K.K.

The polyarylates are polyesters of dihydric phenols with aromatic dicarboxylic acids. The polyarylates used herein are amorphous ones, with polycondensates of bisphenol A with terephthalic acid being especially preferred. The polyarylates tend to develop birefringence due to the inclusion of aromatic rings like the polycarbonates, but are more resistant to heat than the polycarbonates. Polyarylate sheets prepared by casting to be described later are commercially available under the trade name of Elmec from Kaneka K.K.

The cyclo-olefin polymers used herein are preferably highly transmissive to light. Such light transmissive cyclo-olefin polymers are amorphous cyclic polyolefins prepared from norbornene compounds as the starting material. These cyclo-olefin polymers are also resistant to heat. Commercially available cyclo-olefin polymers are useful in the practice of the invention. Commercially available cyclo-olefin polymers are Arton by JSR K.K., Zeonex by Nippon Zeon K.K., and Apel by Mitsui Chemical K.K. Arton and Zeonex are available in the form of sheets. Arton and Zeonex are prepared by effecting ring-opening polymerization of norbornene monomers, followed by hydrogenation. In particular, Arton starts with a norbornene monomer having an ester group on a side chain and is readily soluble in solvents. Arton is advantageous in that it can be formed into sheets by casting. Other advantages of Arton are a high bond strength with the adhesive layer because it is highly bondable with organic materials, and less electrostatic charging leading to less dust attachment.

It is not critical how to prepare the light transmissive sheet. Since the light transmissive sheet used herein is thin, it is difficult to form the sheet by conventional injection molding. Consequently, techniques capable of forming resins into sheets such as solvent casting and melt extrusion are preferable. The especially preferred technique is solvent casting. The casting technique is disclosed, for example, in JP-B 3-75944 as the technique capable of forming flexible disk substrates having improved transparency, birefringence, flexibility, surface precision and film thickness uniformity. In the practice of the invention, the casting technique is preferably utilized in forming the light transmissive sheet.

The process of forming the light transmissive sheet by the casting technique involves (1) dissolving resin pellets such as polycarbonate pellets in a suitable solvent such as methylene chloride, acrylonitrile or methyl acrylate, (2) thoroughly agitating, deaerating and filtering the solution and then continuously flowing the solution on a mold having a high surface precision through a die, (3) evaporating the solvent by passing through a drying furnace, and (4) continuously winding up the sheet into a roll.

The light transmissive sheet formed by the casting technique has a reduced birefringence since it has experienced less tension during manufacture, as compared with the sheet formed by a conventional melt extrusion technique which inevitably develops a distribution of birefringence in a stretched direction. Also, the casting technique can form a sheet of uniform thickness having an excellent surface state by properly controlling the rate of evaporation of the solvent. Additionally, the casting technique eliminates flaws by die lines as found in the melt extruded sheet.

It can be confirmed by an isotropic pattern of birefringence whether or not a particular light transmissive sheet has been formed by the casting technique. The same can also be confirmed by qualitative analysis of the residual solvent in the sheet by gas chromatography.

The light transmissive layer preferably has a thickness in the range of about 30 to 300 $\mu$m. If the light transmissive layer is too thin, the optical influence of dust particles deposited thereon becomes substantial. A light transmissive layer having a thickness beyond the range can be formed by injection molding or other techniques.

The support substrate 20 serves to maintain rigidity for the medium. The support substrate generally has a thickness of about 0.2 to 1.2 mm, preferably about 0.4 to 1.2 mm, and may be either transparent or opaque. Guide grooves which are generally formed in optical recording media are provided in the illustrated medium by forming grooves in the support substrate 20 and transferring the grooves to the light transmissive layer at 21 during its formation. The illustrated guide grooves 21 are depressed toward the light incident side.

EXAMPLE

Examples of the invention are given below by way of illustration and not by way of limitation.

Example 1

Read-only optical disk samples as shown in Table 1 were fabricated as follows.

Sample Nos. 1–4

There were furnished disk-shaped support substrates (polycarbonate, diameter 120 mm, thickness 1.2 mm) having depressions and protrusions serving as information-bearing pits in one surface when viewed from the light transmissive layer side. On the surface of the substrates, a reflecting film of an aluminum alloy was formed by sputtering.

Onto the surface of the reflecting film, a solution of a radical polymerization type UV-curable resin (4X108E by Mitsubishi Rayon K.K.) in butyl acetate was applied by spin coating, forming a resin layer. The resin solution had a solid concentration and a viscosity at 25° C. as shown in Table 1. It is noted that in sample No. 3, a solventless radical polymerization type UV-curable resin (SD-211 by Dai-Nippon Ink & Chemicals K.K.) was used. It is noted that spin coating was effected in a clean room at 25° C.

In vacuum (lower than 0.1 atm.), a polycarbonate sheet (thickness 100 $\mu$m, birefringence 15 nm) serving as the light transmissive sheet was placed on the resin layer. The polycarbonate sheet formed by casting was available under Pure Ace from Teijin K.K. This polycarbonate had a glass transition temperature of 145° C. and a molecular weight of about 40,000.

Next, the entire structure was transferred back in air whereupon UV radiation was irradiated thereto for curing the resin layer which now served as an adhesive layer. Table 1 reports the thickness (average thickness) of the adhesive layer at a location spaced 30 mm (=one half of the substrate radius) from the center of the support substrate. Specifically the thickness of the adhesive layer was determined by peeling the lamination of the adhesive layer and light transmissive sheet from the support substrate after curing, measuring the thickness of this lamination by a micrometer, and subtracting the thickness of the light transmissive sheet from the measured thickness. An alternative measurement procedure is by dipping the lamination into a solvent which can selectively dissolve the light transmissive sheet (e.g., methylene chloride) for dissolving only the light transmissive sheet and leaving the adhesive layer, and measuring the thickness of the adhesive layer.

Sample No. 5

It was fabricated as was sample No. 2 except that a polycarbonate sheet (thickness 100 μm, birefringence 80 nm) formed by melt extrusion was used as the light transmissive sheet. The polycarbonate itself was the same as the cast sheet.

Sample No. 6

It was fabricated as was sample No. 2 except that a cyclo-olefin polymer sheet (thickness 100 μm, birefringence 10 nm) formed by casting was used as the light transmissive sheet. The cyclo-olefin polymer sheet is Arton (by JSR, glass transition temperature 170° C.).

Sample No. 7

It was fabricated as was sample No. 2 except that a polyarylate sheet (thickness 100 μm, birefringence 15 nm) formed by casting was used as the light transmissive sheet. The polyarylate sheet is Elmec (by Kaneka K.K., glass transition temperature 200° C.).

Sample No. 8

It was fabricated as was sample No. 2 except that the light transmissive sheet was placed on the resin coating in air.

Measurement

The above-prepared samples were measured for the thickness distribution of the light transmissive layer and bowing degree. The results are shown in Table 1. The thickness distribution (that is the difference between maximum and minimum thicknesses) of the light transmissive layer was measured by a laser focus displacement meter by Keyence K.K., and over an annular region radially extending from 25 to 58 mm. The bow degree was measured with a mechanical precision meter (Ono Sokki K.K.) by directing light from the support substrate side. The linear velocity during measurement was 4 m/s.

Also the birefringence of the entire light transmissive layer was measured by means of a rotary analyzer type birefringence meter by Admon Science. The results are shown in Table 1.

TABLE 1

| Sample No. | Solid concentration (wt %) | Viscosity (cps) | Adhesive layer average thickness (μm) | Atmosphere of placement |
|---|---|---|---|---|
| 1 | 10 | 2 | 0.2* | vacuum |
| 2 | 35 | 5 | 2.0 | vacuum |
| 3 | 100* | 30* | 5.0* | vacuum |
| 4 | 70* | 60* | 8.0* | vacuum |
| 5 | 35 | 5 | 2.0 | vacuum |
| 6 | 35 | 5 | 2.0 | vacuum |
| 7 | 35 | 5 | 2.0 | vacuum |
| 8 | 35 | 5 | 2.0 | air* |

| Sample No. | Light transmissive sheet material | Light transmissive sheet formation | Thickness distribution (μm) | Bowing degree (deg) | Birefringence (nm) | Remarks |
|---|---|---|---|---|---|---|
| 1 | — | — | — | — | — | short cured adhesive layer |
| 2 | polycarbonate | casting | 3 | 0.18 | <20 | |
| 3 | polycarbonate | casting | 10 | 0.25 | 38 | |
| 4 | polycarbonate | casting | 16 | 0.36 | 42 | |
| 5 | polycarbonate | melt extrusion | 8 | 0.19 | 100 | |
| 6 | cyclo-olefin | casting | 4 | 0.17 | <15 | |
| 7 | polyarylate | casting | 5 | 0.20 | <25 | |
| 8 | polycarbonate | casting | 4 | 0.20 | <20 | bubble-containing adhesive layer |

*outside the limited or preferred range

The effectiveness of the invention is evident from Table 1. More particularly, by setting the average thickness of the adhesive layer within the range of the invention, the light transmissive layer is significantly improved in thickness uniformity. The bowing and birefringence are also improved. A comparison of sample No. 2 with No. 5 reveals that a combination of the cast polycarbonate sheet with the adhesive layer of a specific thickness substantially completely precludes the polycarbonate sheet from increasing its birefringence. It is seen from sample Nos. 6 and 7 that when the cast cyclo-olefin polymer and polyarylate sheets are used, the increase of birefringence can also be precluded substantially completely. In sample No. 1, the light transmissive sheet could not be attached because of short curing of the resin layer.

For sample No. 8 in which the light transmissive sheet was placed on the resin coating in air, the adhesive layer was found to contain bubbles, and upon reading by an optical disk drive, tracking servo errors generated probably due to bubbles. In contrast, the samples prepared by placing the light transmissive sheet on the resin coating in vacuum were found to contain no bubbles in the adhesive layer and to generate no tracking servo errors.

Example 2

Sample No. 9

There was furnished a disk-shaped support substrate (polycarbonate, diameter 120 mm, thickness 1.2 mm) having depressions and protrusions serving as information-bearing pits in one surface when viewed from the light transmissive layer side. On the surface of the substrate, a reflecting film of an aluminum alloy was formed by sputtering.

Onto the surface of the reflecting film, a UV-curable acrylic adhesive (DVD-003 by Nippon Kayaku K.K., viscosity 500 cps at 25° C.) was applied by spin coating, forming a resin layer. It is noted that spin coating was effected in a clean room at 25° C.

In vacuum (lower than 0.1 atm.), a polycarbonate sheet as used in sample No. 2 of Example 1 was placed on the resin layer. The entire structure was then transferred back in air and placed in an autoclave where only pressure was applied without heating. The applied pressure (the pressure within the autoclave) was 1.2 atm. and the pressurizing time was 1 second. After pressurization, UV radiation was irradiated for curing the resin layer which now served as an adhesive layer.

Sample No. 10

Fabrication followed the method of the above-referred JP-A 10-283683. While a disk-shaped support substrate as used in sample No. 9 was rotated at 60 rpm, an adhesive was dispensed in an annular region of the substrate near its inner periphery. A light transmissive sheet was placed on the substrate. At the same time, the number of revolutions was increased from 60 rpm to 4,000 rpm over 5 seconds and maintained thereat for 2 seconds. Then UV radiation was irradiated for curing the adhesive. All these steps were conducted in air. The adhesive and light transmissive sheet used were the same as used in sample No. 9.

Measurement

The above-prepared samples were measured for the average thickness and thickness distribution of the light transmissive layer as in Example 1. It is noted that the thickness distribution of the light transmissive layer was measured over an annular region radially extending from 25 to 58 mm in both radial and circumferential directions. The number of bubbles in the adhesive layer was counted. The results are shown in Table 2.

TABLE 2

| Sample No. | Adhesive layer average thickness ($\mu$m) | Atmosphere of placement | Pressurization | Light transmissive sheet material | Light transmissive sheet formation | Thickness distribution ($\mu$m) Radial | Thickness distribution ($\mu$m) Circumferential | Number of bubbles |
|---|---|---|---|---|---|---|---|---|
| 9 | 15 | vacuum | yes | polycarbonate | casting | 4 | 2 | 1 |
| 10 | 25 | air* | no* | polycarbonate | casting | 12 | 6 | 9 |

*outside the limited or preferred range

It is evident from Table 2 that the procedure of forming a coating of UV-curable adhesive over the entire surface of a support substrate and then placing a light transmissive sheet on the coating in vacuum is effective. Pressurization subsequent to the placement of the light transmissive sheet is effective in reducing the thickness distribution even when the adhesive layer is as thick as 15 $\mu$m in average thickness. A comparison of sample Nos. 9 and 10 reveals that although the amount of adhesive fed to the support substrate surface is equal, the adhesive layer in sample No. 10 is thick as seen from Table 2.

BENEFITS OF THE INVENTION

The invention is successful in forming a light transmissive layer of a uniform thickness by joining a light transmissive sheet of resin to a support substrate through an adhesive layer of a specific thickness. This also restrains any increase of birefringence of the light transmissive sheet and prevents the optical in formation medium from bowing.

By forming a resin layer over the entire surface of a support substrate, then placing a light transmissive sheet on the resin layer, and UV curing the resin layer into an adhesive layer, the thickness distribution of the resulting light transmissive layer, especially in a circumferential direction, is reduced. Placing the light transmissive sheet on the resin layer in a reduced pressure atmosphere is effective in preventing bubbles from entering the adhesive layer. Pressurization following the placement of the light transmissive sheet is effective for reducing the thickness distribution of the light transmissive layer even when the layer is thick.

Japanese Patent Application Nos. 11-204703 and 11-327521 are incorporated herein by reference.

While the invention has been described in terms of a preferred embodiment, it is apparent that other forms could be adopted by one skilled in the art. Accordingly, the scope of the invention is to be limited only by the claims.

What is claimed is:

1. An optical information medium comprising a support substrate having an information recording means on one surface thereof, and a light transmissive layer on the support substrate surface, wherein writing and/or reading light enters the information recording means through the light transmissive layer, said light transmissive layer comprising a light transmissive sheet comprising a resin and an adhesive layer for joining the light transmissive sheet to the support substrate, said adhesive layer comprising a cured product of a UV-curable resin and having an average thickness from 0.5 $\mu$m to 3 $\mu$m.

2. The optical information medium of claim 1 wherein said light transmissive sheet is comprised of a polycarbonate, polyarylate or cyclo-olefin polymer.

3. The optical information medium of claim 1 wherein said light transmissive sheet has been formed by casting the resin.

4. The optical information medium of claim 1 wherein the adhesive layer has an average thickness of from 1–3 $\mu$m.

5. The optical information medium of claim 1 wherein the UV-curable resin is an epoxy resin.

6. An optical information medium comprising a support substrate having an information recording means on one surface thereof, and a light transmissive layer on the support substrate surface, wherein writing and/or reading light enters the information recording means through the light transmissive layer, said light transmissive layer comprising a light transmissive sheet comprising a resin and an adhesive layer for joining the light transmissive sheet to the support substrate, said adhesive layer comprising a cured product of a UV-curable resin and having an average thickness from 0.5 $\mu$m to less than 5 $\mu$m, wherein said optical information medium is obtained by a method comprising the steps of:

applying the UV-curable resin or a solution thereof onto the entire surface of said support substrate to form a coating, placing the light transmissive sheet on the coating, and curing the UV-curable resin into the adhesive layer by irradiating ultraviolet radiation to the coating.

7. A method for preparing an optical information medium comprising a support substrate having an information recording means on one surface thereof, and a light transmissive layer on the support substrate surface, wherein writing and/or reading light enters the information recording means through the light transmissive layer, said light transmissive layer comprising a light transmissive sheet comprising a resin and an adhesive layer for joining the light transmissive sheet to the support substrate, said adhesive layer comprising a cured product of a UV-curable resin, said method comprising the steps of:

applying the UV-curable resin or a solution thereof onto the entire surface of said support substrate to form a coating, placing the light transmissive sheet on the coating in a reduced pressure atmosphere, and curing the UV-curable resin into the adhesive layer by irradiating ultraviolet radiation to the coating.

8. The method of claim 7 wherein the UV-curable resin or the solution thereof has a viscosity of less than 10 centipoise.

9. The method of claim 7 wherein the solution of the UV-curable resin has a solid concentration of 10 to 50% by weight.

10. The method of claim 7 further comprising between the placing step and the curing step the pressurizing step of applying a pressure to the surface of the light transmissive sheet.

11. The method of claim 10 wherein the pressurizing step includes feeding a gas under pressure over the light transmissive sheet.

12. The method of claim 11 wherein the pressure is about 1.05–2.5 atm.

13. The method of claim 12 wherein the pressure is about 1.1–1.8 atm.

14. The method of claim 7 wherein the UV-curable resin or a solution thereof is applied by spin coating.

* * * * *